Nov. 11, 1958   E. A. STALKER   2,859,910
STATORS FOR AXIAL FLOW COMPRESSORS
Filed March 29, 1954
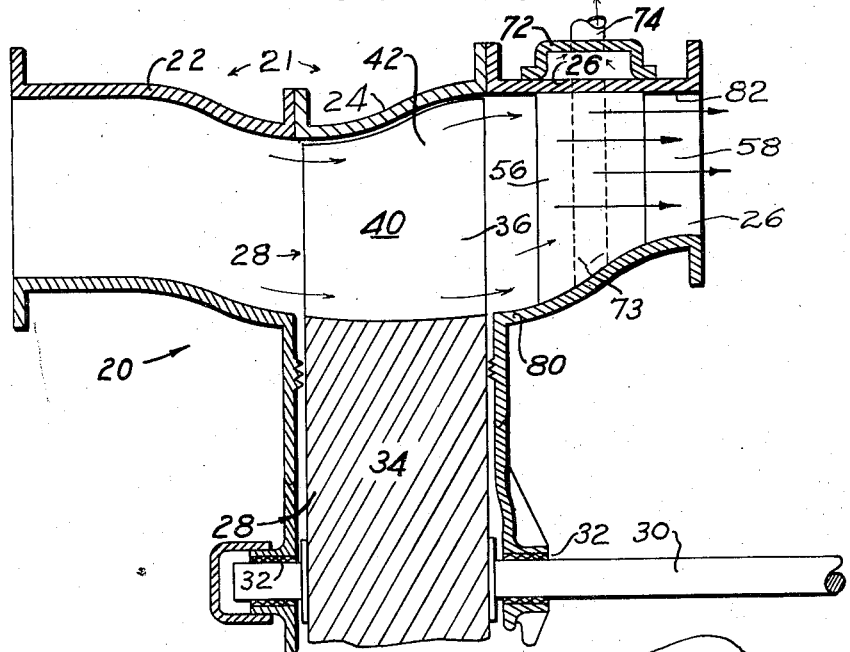
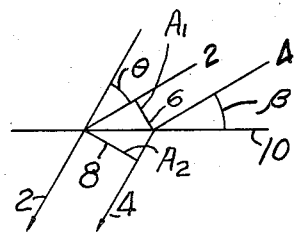
Fig. 1
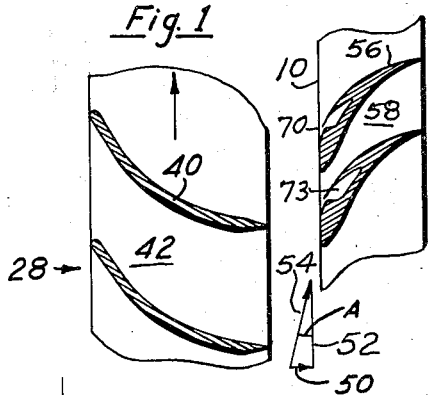
Fig. 3
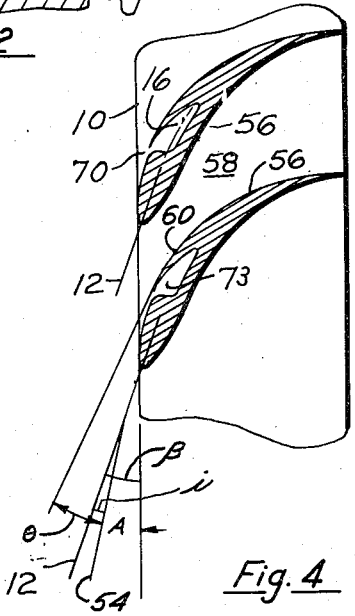
Fig. 4
INVENTOR.
Edward A. Stalker 2,859,910

STATORS FOR AXIAL FLOW COMPRESSORS

Edward A. Stalker, Bay City, Mich.

Application March 29, 1954, Serial No. 419,434

5 Claims. (Cl. 230—120)

This invention relates to axial flow fluid machines for increasing the pressure of an elastic fluid and particularly to the stator blades.

An object of the invention is to provide a stator which can operate efficiently with blades positioned at very small inlet angles and turning the flow through relatively large angles.

Another object is to provide a stator for a radial diffusion axial flow machine.

Still another object is to provide stator blades having slots positioned therein at an optimum location with respect to the blade chord.

Other objects will appear from the description, drawings and claims.

When a tube of flow, represented in Fig. 1 by streamlines 2 and 4 is turned through an angle $\theta$ the cross sectional width 6 is increased to that at 8. It follows from the geometry that the ratio of the cross sectional area (A2) at 8 to (A1) at 6, for the same depth, is $$A_2/A_1 = \frac{\sin(\beta+\theta)}{\sin \beta} \quad (1)$$

which may be called the diffusion ratio D.

The streamlines 2 and 4 of Figure 1 may be regarded as those approaching and passing part way through a stator and the angle $\theta$ gives the amount of turning which the stator accomplishes at an axial locality rearward from the leading edges of the blades.

For efficient performance the diffusion ratio D for stators should be kept to values less than about 2.0. Then Equation 1 may be rewritten in radians for small values of $\beta$ as $$\beta+\theta=2\beta$$
$$\theta=\beta$$

The blade inlet angle $\beta$ (see Fig. 4) is defined by the stator plane 10 and the tangent 12 to the mean camber line 16 at the center for the nose radius. If this angle $\beta$ is 10°, for instance, then $\theta$ should be about 10° for the portion of the blade along which diffusion occurs. This will be the portion extending from the leading edge rearward somewhat beyond the point transversely across from the leading edge of the adjacent said blade.

If very large pressure rises are to be achieved by a large diffusion ratio D in the rotors, of 1.3 or larger, the fluid leaving the rotor will have a small angle with respect to the plane of rotation, and consequently the range of operation will tend to be limited with respect to volume flow. This invention provides means to overcome this disadvantage.

The compressor 20 in Figure 2 has the case means 21 comprising the inlet duct 22, the rotor case 24, and and the stator case 26 which also defines the exit duct. The rotor 28 has its shaft 30 mounted in bearings 32 for rotation in the rotor case. The hub 34 defines an annular channel 36 with the rotor case.

The rotor blades 40 are carried on the hub 34 and divide the channel into a plurality of rotor passages 42 between the blades.

The blades increase in radial depth rearward so that the cross sectional areas of the rotor passages increase rearward and the cross sectional area at the exit of each passage is larger than at the inlet. Thus a very large diffusion ratio may exist which gives a small value of the flow velocity leaving the rotor relative thereto.

In Figure 3 the relative velocity vector leaving the rotor 28 is 50. The peripheral vector is 52 which combined with 50 gives the absolute vector 54. This vector makes the angle A with the plane of the stator.

The vector 54, Figure 4, has the angle of incidence $i$ with respect to the tangent 12 to the mean camber line of the stator blade 56. As the flow turns through the angle $\theta$ it is diffused along each stator blade back to about the point 60 transversely across the stator passage from the leading edge of the stator blade adjacent the convex side of the blade. See Fig. 4.

Rearward of the point 60 the cross sectional areas decrease so that the flows in the stator passages 58 are accelerated. This will be further discussed subsequently.

For small angles A the amount of turning demanded of the flow up to the point 60 will be too great for effective operation of the stator and the flows about the blades will become separated and turbulent.

To preclude the occurrence of separation and the resulting turbulence, an induction boundary layer control slot 70 is placed in the convex side of each stator blade ahead of the locality 60 and preferably somewhat ahead of the mid-chord point of the blade. Due to the high static pressure of the pumped fluid the boundary layer at each blade will enter the slot and flow through the blade channel 73 to the annular collector 72 from which it may be ducted by tube 74 for use at some other locality.

The stator passages 58 aft of points 60 have decreasing cross sectional areas accomplished by the properly varied thickness of the stator blades along their chords and by the divergence of the inner shroud 80 outward with respect to the axis of rotation. Preferably the outer wall 82 of the stator case 26 is substantially parallel to the axis of rotation so the outward sweep of the inner shroud rapidly reduces the radial depths of the stator passages.

The fluid leaving the rotor has a substantial rotation imparted by the rotor and therefore presses against the portion of the case at the radially outer sides of the stator passages, that is at the radially outer ends of the stator blades. It is important that this portion be substantially parallel to the axis of rotation or free of substantial convergence toward the axis so that the fluid does not tend to press forward, that is have upstream component of centrifugal pressure in the axial direction along the case. Such a tendency will be large where the flow approaches the stator at a small angle and the outer case converges downstream toward the axis of rotation. An upstream component of fluid centrifugal pressure will oppose the flow to the extent of greatly lowering the volume of fluid flow.

It is important therefore that the decrease in cross sectional area of each stator passage be achieved chiefly by the portion of the case means at the radially inner sides of the stator passages. That is this portion of the case means should diverge from the axis along the rearward direction.

The rotor passages 42 between blades increase in cross sectional area because of the curvature in the blades as well as because of the increasing radial depth. Preferably the blades have their rear portions directed more nearly along the axis of rotation than along the direction of the tangent to the mean camber line at the nose of the blade.

It will now be clear that I have disclosed a unique compressor having a rotor adapted to produce a large diffusion ratio in the rotor passages between blades. This leads to small axial velocities of the flow leaving the rotor and correspondingly very small angles of approach of the pumped fluid relative to the stator blades, measured with respect to the stator plane.

A stator is provided to turn the approaching flow effectively. This is accomplished by a boundary layer control slot uniquely positioned in each blade. The action of the slot is augmented by proportioning the blades and stator walls to induce the fluid to flow in streamline fashion along the blade and wall surfaces. Preferably the proportions provide for decreasing cross sectional areas along the stator passages. These features make the compressor efficient in producing a high pressure ratio with a large volume of flow per revolution of the rotor.

While I have illustrated a specific form in this invention it is to be understood that I do not intend to limit myself to this exact form but intend to claim my invention broadly as indicated by the appended claims.

What I claim is:

1. In combination in an axial flow compressor for increasing the pressure of an elastic fluid, a case means, a rotor hub mounted in said means for rotation about an axis, a plurality of axial flow rotor blades mounted on said hub in peripherally spaced relation with rotor flow passages therebetween, a stator positioned in said case means on the downstream side of said rotor hub in planes normal to said axis, said case means and said hub diverging and said rotor passages increasing in cross sectional area in the downstream direction providing a diffusion ratio greater than 1.3 establishing a small approach angle for pumped fluid relative to a said plane of said stator, said stator comprising a plurality of curved stator blades spaced peripherally with stator passages therebetween to receive said fluid from said rotor passages, each said stator blade having an induction slot in the convex side thereof leading into the interior thereof and positioned ahead of the mid chord point of said blade and ahead of the point on said blade transversely across the intervening stator passage from the leading edge of the stator blade adjacent said convex side, and means to induce flows of said fluid into said slots.

2. In combination in an axial flow machine for increasing the pressure of a fluid, a case means, a rotor hub mounted in said means for rotation about an axis, a plurality of axial flow rotor blades mounted on said hub in peripherally spaced relation with rotor flow passages therebetween, a stator positioned in said case means on the downstream side of said rotor hub in planes normal to said axis, each said rotor blade having its aft portion directed more along said axis than along the tangent to the mean camber line at the leading edge giving said fluid a small approach angle relative to said plane of said stator, said stator comprising a plurality of curved stator blades spaced peripherally with stator passages therebetween to receive said fluid from said rotor passages, each said stator blade having an induction slot in the convex side thereof leading into the interior thereof and positioned at a point transversely across the intervening stator passage from the leading edge of the stator blade adjacent said convex side or ahead of said point, and duct means in communication with said interior to induce flows of said fluid into said slots.

3. In combination in an axial flow compressor for increasing the pressure of an elastic fluid, a case means having inner and outer portions defining an annular duct for conducting fluid, a rotor hub mounted in said means for rotation about an axis, a plurality of axial flow rotor blades mounted on said hub in peripherally spaced relation with rotor flow passages therebetween, a stator positioned in said case means on the downstream side of said rotor hub in planes normal to said axis, said blades increasing in radial depth and said rotor flow passages having increasing cross sectional area rearward along the axial direction providing a large diffusion ratio greater than 1.3 establishing a small approach angle for pumped fluid relative to a said plane of said stator, said stator comprising a plurality of curved stator blades spaced peripherally with stator passages therebetween to receive said fluid from said rotor passages, said stator passages being bounded at their radially opposite sides by portions of said case means, each said stator blade having an induction slot in the convex side thereof leading into the interior thereof and positioned substantially ahead of the mid chord points of said blade and ahead of points transversely across the intervening stator passage from the leading edge of a said stator blade adjacent to said convex side, and duct means communicating with said stator blade interiors to induce flows of said fluid through said slots, said portion of said case means at the inner sides of said stator passages converging relative to the portion of said case means bounding the outer side of said stator passages to decrease the cross sectional areas of said stator passages rearward along the curved portions of said blades.

4. In combination in an axial flow compressor for increasing the pressure of an elastic fluid, a case means having inner and outer portions defining an annular duct for conducting fluid, a rotor hub mounted in said means for rotation about an axis, a plurality of axial flow blades mounted on said hub in peripherally spaced relation with rotor flow passages therebetween, a stator positioned in said case means on the downstream side of said rotor hub in planes normal to said axis, said case means and said hub diverging and said rotor passages increasing in cross sectional area in the downstream direction providing a large diffusion ratio greater than 1.3 establishing a small approach angle for pumped fluid relative to the plane of said stator and developing substantial fluid centrifugal pressures against said outer portions of said case means, said stator comprising a plurality of curved stator blades spaced peripherally with stator passages therebetween to receive said fluid from said rotor passages, each said stator blade having an induction slot in the convex side thereof leading into the interior thereof and positioned ahead of points transversely across the intervening stator passage from the leading edge of the stator blade adjacent said convex side, and duct means communicating with said stator blade interiors to induce flows of said fluid into said slots, said case means at the radially inner ends of said stator blades converging rearwardly and outwardly relative to the outer portion of said case means and including a concave surface followed by a surface convex to the flow of fluid in said stator passages to decrease the cross sectional areas of said stator passages rearward along a major part of the axial lengths of said stator blades.

5. In combination in an axial flow compressor for increasing the pressure of an elastic fluid, a case means having inner and outer portions defining an annular duct for conducting fluid, a rotor hub mounted in said means for rotation about an axis, a plurality of axial flow blades mounted on said hub in peripherally spaced relation with rotor flow passages therebetween, a stator positioned in said case means on the downstream side of said rotor hub in planes normal to said axis, said blades increasing in radial depth and said rotor flow passages having increasing cross sectional area rearward along the axial direction providing a large diffusion ratio greater than 1.3 establishing a small approach angle for pumped fluid relative to said plane of said stator, said stator comprising a plurality of curved stator blades spaced peripherally with stator passages therebetween to receive said fluid from said rotor passages, each said stator blade having a slot in the convex side thereof leading into the interior thereof and positioned ahead of mid chord points and ahead of points transversely across the intervening stator passage from the leading edge of a said stator blade adjacent to said convex side, the outer portion of said case means at the radially outer ends of said stator blades being substantially parallel to said axis and the portion of said case means at the radially inner ends of said stator blades converging downstream toward said outer portion to decrease the cross sectional areas of said stator passages rearward along a major portion of the axial length of said stator blades, and duct means in communication with said stator blade interiors to induce flows of said fluid through said slots.

References Cited in the file of this patent

UNITED STATES PATENTS

| | | |
|---|---|---|
| 2,314,058 | Stalker | Mar. 16, 1943 |
| 2,344,835 | Stalker | Mar. 21, 1944 |
| 2,597,510 | McBride | May 20, 1952 |
| 2,649,243 | Stalker | Aug. 18, 1953 |
| 2,663,996 | Stalker | Dec. 29, 1953 |
| 2,762,560 | Jakobsen | Sept. 11, 1956 |

FOREIGN PATENTS

| | | |
|---|---|---|
| 833,532 | France | July 25, 1938 |